United States Patent
Zheng et al.

(10) Patent No.: US 11,808,041 B2
(45) Date of Patent: Nov. 7, 2023

(54) IMPACT RESISTANT ROOFING SYSTEMS AND METHODS

(71) Applicant: Building Materials Investment Corporation, Dallas, TX (US)

(72) Inventors: Yan Zheng, Livingston, NJ (US); Adem Chich, Kearney, NJ (US); Yixi Xiao, Edison, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/394,452

(22) Filed: Aug. 5, 2021

(65) Prior Publication Data
US 2021/0363757 A1    Nov. 25, 2021

Related U.S. Application Data

(63) Continuation of application No. 17/147,039, filed on Jan. 12, 2021, now Pat. No. 11,085,189.
(Continued)

(51) Int. Cl.
*E04D 11/00*  (2006.01)
*E04D 11/02*  (2006.01)
(Continued)

(52) U.S. Cl.
CPC ............... *E04D 11/02* (2013.01); *B32B 3/30* (2013.01); *B32B 7/12* (2013.01); *B32B 27/08* (2013.01);
(Continued)

(58) Field of Classification Search
CPC ....... E04D 1/28; E04D 2001/005; E04D 1/24; E04D 2001/308; E04D 1/30;
(Continued)

(56) References Cited

U.S. PATENT DOCUMENTS 2,616,283 A    11/1952    Branstrator et al.
2,666,354 A    1/1954     Dim et al.
(Continued)

FOREIGN PATENT DOCUMENTS

CN    109563867 B    1/2021
DE    2855743 A1     7/1980
(Continued)

OTHER PUBLICATIONS

EBAY; https://www.ebay.com/itm/4-4-Solar-Self-Seal-Roof-Mounting-Brackets-Unistrut-Superstrut-Rail-standoffs-/151271225082; 4) 4+" Solar Self Seal Roof Mounting Brackets Unistrut/Superstrut Rail Standoffs; available prior to Sep. 30, 2019.
(Continued)

*Primary Examiner* — Chi Q Nguyen
(74) *Attorney, Agent, or Firm* — WOMBLE BOND DICKINSON (US) LLP

(57) ABSTRACT

A hail resistant roofing system and method includes a roofing substrate such as a shingle or tile or membrane having an array of exposed upwardly projecting features. The features may rise to sharp points and may have side surfaces that are angled relative to the plane of the roofing substrate. The features are spaced and arranged so that a large hail stone capable of damaging the roofing substrate will always impact one or more of the exposed features. This can break up the hail stone into smaller benign pieces or can redirect the energy and direction of the hail stone so that the impact is absorbed without damage to the roofing substrate.

20 Claims, 7 Drawing Sheets

Related U.S. Application Data

(60) Provisional application No. 62/977,965, filed on Feb. 18, 2020, provisional application No. 62/960,216, filed on Jan. 13, 2020.

(51) Int. Cl.
| | | |
|---|---|---|
| *B32B 3/30* | (2006.01) | |
| *B32B 27/32* | (2006.01) | |
| *B32B 27/08* | (2006.01) | |
| *E04D 12/00* | (2006.01) | |
| *E04H 9/14* | (2006.01) | |
| *B32B 7/12* | (2006.01) | |

(52) U.S. Cl.
CPC ............ *B32B 27/32* (2013.01); *E04D 12/002* (2013.01); *E04H 9/14* (2013.01); *B32B 2419/06* (2013.01)

(58) Field of Classification Search
CPC ..... E04D 37/206; E04D 11/02; E04D 12/002; B32B 5/16; B32B 3/30; B32B 7/12; B32B 27/08; B32B 27/32; B32B 37/206; B32B 37/20; B32B 2037/266; B32B 2037/264; B32B 2419/06; B32B 2309/12; E04H 9/14; Y10T 428/24612; Y10T 428/24025; Y10T 156/1084; Y10T 442/10
USPC ......... 52/747.1, 518, 508, 57; 156/269, 249; 428/172, 101, 173
See application file for complete search history.

(56) References Cited

U.S. PATENT DOCUMENTS

| | | | |
|---|---|---|---|
| 3,750,523 A | 8/1973 | Fujita | |
| 4,442,148 A | 4/1984 | Stierli | |
| 5,082,412 A | 1/1992 | Thomas | |
| 5,304,023 A | 4/1994 | Toback et al. | |
| 5,472,241 A | 12/1995 | Kosik, Jr. et al. | |
| 5,647,178 A | 7/1997 | Cline | |
| 5,685,117 A * | 11/1997 | Nicholson | E04D 1/18 52/557 |
| 5,784,846 A | 7/1998 | Godschalx | |
| 5,786,085 A | 7/1998 | Tzeng et al. | |
| 5,873,201 A | 2/1999 | Fey | |
| 5,956,913 A * | 9/1999 | Nicholson | E04D 1/2916 52/557 |
| 5,979,133 A | 11/1999 | Funkhouser | |
| 6,228,785 B1 | 5/2001 | Miller et al. | |
| 6,282,858 B1 | 9/2001 | Swick | |
| 6,341,462 B2 | 1/2002 | Kiik et al. | |
| 6,536,729 B1 | 3/2003 | Haddock | |
| 6,709,994 B2 | 3/2004 | Miller et al. | |
| 6,773,791 B1 | 8/2004 | Ruggie et al. | |
| D501,052 S | 1/2005 | Yang et al. | |
| 7,132,151 B2 | 11/2006 | Rasmussen | |
| 7,329,077 B2 | 2/2008 | Curtis | |
| 7,685,785 B2 | 3/2010 | Johnson | |
| 7,788,870 B1 * | 9/2010 | Spencer | E04D 13/002 52/530 |
| 7,833,338 B2 | 11/2010 | Whitaker et al. | |
| 8,266,861 B2 | 9/2012 | Koch et al. | |
| 8,277,882 B2 * | 10/2012 | Smith | E04D 5/12 427/188 |
| 8,424,821 B2 | 4/2013 | Liu | |
| 8,689,517 B2 | 4/2014 | Schaefer et al. | |
| 8,715,819 B2 * | 5/2014 | Gencer | B29C 63/0017 428/116 |
| 8,920,088 B1 | 12/2014 | Garvin | |
| 8,966,850 B2 * | 3/2015 | Jenkins | H02S 20/23 52/553 |
| 9,010,058 B2 | 4/2015 | DeJarnette et al. | |
| 9,499,986 B2 * | 11/2016 | Kalkanoglu | E04D 13/12 |
| 9,995,333 B2 | 6/2018 | McPheeters | |
| 10,291,176 B2 | 5/2019 | Wentworth et al. | |
| 10,822,800 B2 * | 11/2020 | Kraft | E04D 1/265 |
| 10,837,176 B2 * | 11/2020 | Lai | B32B 27/36 |
| 11,085,189 B2 | 8/2021 | Zheng | |
| 11,085,198 B2 | 8/2021 | Zheng | |
| 2002/0032000 A1 | 3/2002 | Lawless, III et al. | |
| 2002/0076525 A1 | 6/2002 | Fensel et al. | |
| 2002/0078651 A1 | 6/2002 | Freshwater et al. | |
| 2007/0079865 A1 | 4/2007 | Warfield et al. | |
| 2008/0152867 A1 * | 6/2008 | Di Pede | B32B 5/024 427/256 |
| 2008/0248246 A1 * | 10/2008 | Shiao | E04D 5/12 428/147 |
| 2009/0317593 A1 * | 12/2009 | Smith | B32B 37/24 428/143 |
| 2010/0223872 A1 * | 9/2010 | Taylor | E04F 15/02188 52/309.3 |
| 2011/0223410 A1 | 9/2011 | Gencer et al. | |
| 2012/0138570 A1 | 6/2012 | Millward et al. | |
| 2012/0186722 A1 | 7/2012 | Lennox et al. | |
| 2012/0266559 A1 | 10/2012 | Thies, III | |
| 2013/0025224 A1 | 1/2013 | Vermilion et al. | |
| 2014/0349072 A1 | 11/2014 | Hong et al. | |
| 2015/0047285 A1 | 2/2015 | Dejarnette et al. | |
| 2015/0082722 A1 * | 3/2015 | Kalkanoglu | E04D 13/172 52/302.1 |
| 2016/0333591 A1 | 11/2016 | Polumbus | |
| 2018/0087558 A1 | 3/2018 | Feldmann et al. | |
| 2018/0187419 A1 * | 7/2018 | Lai | B32B 5/32 |
| 2018/0320368 A1 | 11/2018 | Gonzales et al. | |
| 2019/0301509 A1 | 10/2019 | Philip | |
| 2021/0095475 A1 | 4/2021 | Zheng et al. | |

FOREIGN PATENT DOCUMENTS

| | | |
|---|---|---|
| EP | 1002681 A2 | 5/2000 |
| EP | 26626646 A1 | 11/2013 |
| WO | WO2012/153246 A1 | 11/2012 |

OTHER PUBLICATIONS

International Search Report and the Written Opinion of the International Searching Authority for PCT/US2021/013095, dated Apr. 7, 2021.

* cited by examiner

IMPACT RESISTANT ROOFING SYSTEMS AND METHODS

REFERENCE TO RELATED APPLICATION

The present Patent Application is a continuation of U.S. patent application Ser. No. 17/147,039 filed Jan. 12, 2021, now U.S. Pat. No. 11,085,189 issued on Aug. 10, 2021, and claims the benefit of U.S. Provisional Application No. 62/960,216, filed Jan. 13, 2020, and claims the benefit of U.S. Provisional Application No. 62/977,965, filed Feb. 18, 2020.

INCORPORATION BY REFERENCE

The disclosures made in U.S. patent application Ser. No. 17/147,039, filed Jan. 12, 2021, now U.S. Pat. No. 11,085, 189 issued on Aug. 10, 2021. U.S. Provisional Application No. 62/960,216, filed Jan. 13, 2020, and U.S. Provisional Application No. 62/977,965, filed Feb. 18, 2020, are specifically incorporated by reference herein as if set forth in their entireties.

TECHNICAL FIELD

This disclosure relates generally to roofing products and more specifically to residential roofing products configured to provide protection against impacts such as from hail.

BACKGROUND

Residential and other steep slope roofing products, such as asphalt shingles for example, generally are not sufficiently hail resistant. Severe hail storms can cause extensive damage to a shingled roof, often necessitating that a complete new roof be installed. Other types of residential roofing such as roofing tiles, single ply membrane roofing, and liquid applied roofing can suffer the same fate. A need thus exists for roofing systems that are significantly more resistant to impact damage from hail stones. It is to the provision of such a roofing system and related methods that this disclosure is primarily directed.

SUMMARY

Briefly described, according to one aspect, a roofing system includes, in one embodiment, a roofing substrate having a repetitive array of exposed upwardly projecting features with angled sides, tips, and/or ridges. The structures are sized and configured to engage and break up incoming hail stones that may impact the roof. In another embodiment, a repetitive array of exposed surface structures or features having sloped, conical, hemispherical or otherwise angled or expanding side surfaces are configured to engage incoming hail stones and partially divert their impact momentum vector from generally perpendicular to the roofing substrate, where the substrate has a low strength, to an impact vector that is angled or generally parallel to the roofing substrate where the substrate has a high mechanical durability. Damage to the substrate can be reduced or abated.

For example, in some embodiments, a hail resistant roofing system is provided, comprising a roofing substrate having an array of exposed upstanding features sized and arranged to intercept incoming hail stones and break up the hail stones and/or other objects, and at least partially absorb the energy of the impact therefrom so as to reduce hail damage to the roofing substrate. Adjacent surface features can be spaced apart by a distance based upon a range of sizes of the object striking the substrate and a strength of the impact resistant material of the surface features. In some embodiments, of the roofing system, an underlayment can be positioned between the substrate and a deck of the roof.

In some embodiments, such features can comprise substantially pointed elements or features. In other embodiments, the features can be generally cone-shaped; for example, being shaped generally as polygon cones. In still other embodiments, the features can be arranged in spaced lines. Some of the features further can have first and second faces rising at an angle from the roofing substrate; which faces can be separated or can meet at a common, rounded or a generally sharp or otherwise angled edge at the top of each feature.

In still further embodiments of a hail resistant roofing system according to the present disclosure, the features can include sloped side surfaces. In some embodiments, the features can comprise pyramid shaped members. In other embodiments, the features can be generally triangularly shaped. In still other embodiments, the features can be rounded, hemispherical, or elliptical.

In addition, in various embodiments of the hail resistant roofing systems according to the present disclosure, the features can be formed of various materials. For example, in embodiments, the features can comprise metal, wood, plastic, rubber, or composite materials, or combinations thereof. The materials further can be selected based on various functional or performance properties, such as strength, impact resistance, resilience and/or energy absorption, and/or combinations thereof. For example, in some embodiments, the material of the surface features can have a density and/or impact strength selected to cause a break-up and/or diversion of an object striking the substrate.

In another aspect, the roofing system can include a roofing material configured to substantially withstand and/or absorb impacts from hail and other objects striking the roof. In some embodiments, the roofing material has a first or top exposed sheet of a polymer material, a second or bottom sheet of a polymer material, and a third or internal sheet of a polymer material. The third sheet of polymer material can be shaped to create individual interior volumes or chambers between the top and bottom sheets. The interior volumes are filled with an energy absorbing filler material such as sand. Upon impact by a hail stone, the force of the impact displaces the filler material to dissipate the energy of the impact thereby preserving the functional aspects of the roofing material. In the event of a severe impact or multiple impacts that penetrate the exposed sheet of polymer, the filler material will leak out to provide an indication from the ground of a functional failure along the roof.

In some embodiments, the roofing material is provided with a top surface, a bottom surface, and an energy dissipating material filling a volume between the top surface and the bottom surface. In embodiments, the energy dissipating material will comprise a particulate material. For example, the particulate material can comprise sand, ground tire rubber, ground recycled asphaltic shingles, rice hulls, clay granules, or any other suitable material, and combinations thereof. In additional embodiments, the energy dissipating material can comprise a non-granular material; such as, for example, but without limitation, a gel material.

In further embodiments of the roofing system, the roofing material can include an energy dissipating material having a color contrasting with a color of at least the top surface to indicate a functional failure when the top surface is penetrated and the energy dissipating material leaks.

The foregoing and other advantages and aspects of the embodiments of the present disclosure will become apparent and more readily appreciated from the following detailed description and the claims, taken in conjunction with the accompanying drawings. Moreover, it is to be understood that both the foregoing summary of the disclosure and the following detailed description are exemplary and intended to provide further explanation without limiting the scope of the disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

Figure 1:
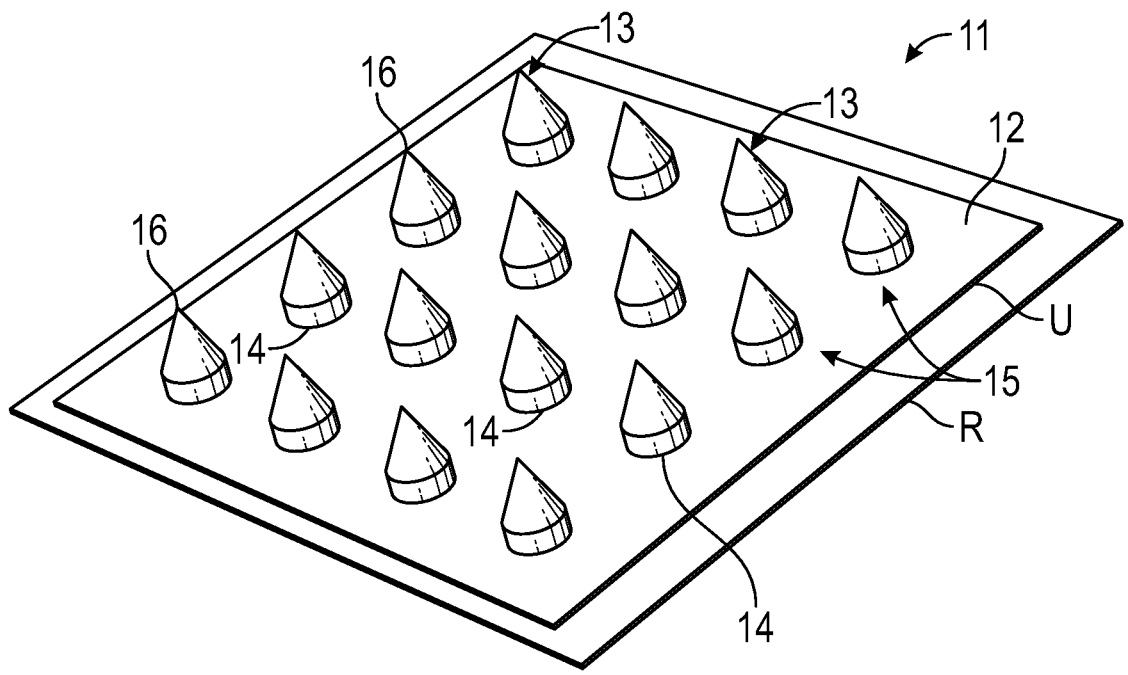
FIG. 1 is an isometric view of a section of a roofing system that embodies principles of the present disclosure in one exemplary form.

Embodiments of the present disclosure will now be described in more detail with reference to the accompanying drawing figures, wherein reference numerals indicate various elements throughout the figures.

FIG. 1 illustrates one embodiment of a hail resistant roofing system according to the present disclosure. The system 11 comprises a roofing substrate or material 12 that may include virtually any roofing substrate including, but not limited to, asphalt shingles, a roofing membrane, a liquid applied roofing product, and tiles to name a few. The roofing substrate or material 12 will be positioned over a roof deck or roofing structure, such as by being rolled out or otherwise placed onto an upper surface of the roof deck, and can be secured by adhesives or sealant materials, fasteners, connectors or other attachments. A plurality or an array 13 of exposed upwardly projecting impact resistant or impact dissipating surface features or structures 15 is attached to the roofing substrate 12. In this embodiment, each feature or structure 15 of the array has a generally cylindrical base 14 from which rises or extends a conical section terminating in a relatively sharp tip portion 16.

In some embodiments, the features may be made of a material having a hardness sufficient to withstand and at least partially absorb or deflect the force of impact of objects, such as hail or (e.g. ice balls of up to 2-3 inches in diameter) or other objects striking the roof, without substantially breaking or being dislodged. Non-limiting examples of the sufficiently hard materials include metal, wood, plastic, rubber and/or composite materials.

In some embodiments, the length or height of each feature may be $1/32$ inch to 6 inches. In some embodiments, the length or height of each feature may be $1/32$ inches to 5 inches. In some embodiments, the length or height of each feature may be $1/32$ inches to 4 inches. In some embodiments, the length or height of each feature may be $1/32$ inches to 3 inches. In some embodiments, the length or height of each feature may be $1/32$ inches to 2 inches. In some embodiments, the length or height of each feature may be $1/32$ inches to 1 inch. In some embodiments, the length or height of each feature may be $1/32$ inches to $1/2$ inch.

In other embodiments, the length or height of each feature may be $1/2$ inch to 6 inches. In some embodiments, the length or height of each feature may be 1 inch to 6 inches. In some embodiments, the length or height of each feature may be 2 inches to 6 inches. In some embodiments, the length or height of each feature may be 3 inches to 6 inches. In some embodiments, the length or height of each feature may be 4 inches to 6 inches. In some embodiments, the length or height of each feature may be 5 inches to 6 inches.

In some embodiments, the length or height of each feature may be $1/2$ inch to 5 inches. In some embodiments, the length or height of each feature may be 1 inch to 4 inches. In some embodiments, the length or height of each feature may be 2 inches to 3 inches. In some embodiments, the length or height of each feature may be $1/32$ inch to 5 inches.

In other embodiments, the distance between the surface features of the array, such as between the tips 16 of such features 15 may be $1/8$ inch to 2 inches. In some embodiments, the distance between tips of the surface features 15 may be $1/2$ inch to 2 inches; and in some embodiments, may be $3/4$ inch to 2 inches; or may be 1 inch to 2 inches; or may be $1 1/2$ inches to 2 inches. In some other embodiments, the distance between features of the array, such as between the tips 16 of the features may be $1/8$ inch to 1 inch. In other embodiments, the distance between tips of the surface features of the array may be $1/8$ inch to $1/2$ inch; and/or may be $1/8$ inch to $1/4$ inch. Other spacing's between the tips of the surface features also can be provided. In embodiments, the density of the surface features of the array on the surface of the roofing substrate 12—i.e., the number of surface features per unit area—is based, at least in part, on the size of the hail stones. In some embodiments, the density of the surface features corresponds to a maximum distance between surface features, as measured from the outer perimeter of each surface feature, of $1/4$ inch to 1 inch. In some embodiments, the density of the surface features corresponds to a maximum distance between surface features, as measured from the outer perimeter of each surface feature, of $1/4$ inch to $3/4$ inch. In some embodiments, the density of the surface features corresponds to a maximum distance between surface features, as measured from the outer perimeter of each surface feature, of $1/4$ inch to $1/2$ inch. In some embodiments, the density of the surface features corresponds to a maximum distance between surface features, as measured from the outer perimeter of each surface feature, of $1/2$ inch to 1 inch. In some embodiments, the density of the surface features corresponds to a maximum distance between surface features, as measured from the outer perimeter of each surface feature, of ¾ inch to 1 inch. In some embodiments, the density of the surface features corresponds to a maximum distance between surface features, as measured from the outer perimeter of each surface feature, of about ½ inch.

In some embodiments, the angle of the conical section of the surface features 15, such as shown in FIG. 1 for example, with respect to a normal to the plane of the substrate 12 may be within a range of plus or minus 30 degrees. The sizes of the surface features, including the spacing's between each of the surface features and the angle(s) of a conical section and/or the angles of sloping side walls of surface features of various configurations, non-limiting examples of which are shown in FIGS. 1-7c values should be chosen such that hail stones larger than a predetermined size likely to do damage to the substrate 12 (e.g. stones of ½ inch to 3 inches in diameter, ½ inch to 2½ inches, ½ inch to 2 inches, ½ inch to 1½ inches, ½ inch to 1 inch), will have an increased likelihood of impacting the sharp tips 16 of the surface features 15 in an array 13. Other sizes, spacing's and configurations of the surface features adapted to promote the break-up and/or deflection of other sizes of hail stones and other objects impacting the substrate, for the absorption of energy therefrom, also can be provided.

The materials for such surface features also should be selected to have materials properties such as a density and/or high impact strength such that when an impact occurs, the force of the impact on the sharp tips breaks up an object such as a hail stone into smaller pieces before any part of the hail stone engages the roofing substrate 12. The breaking up of the hail stone absorbs much of the energy of the impact and the resulting smaller pieces of ice that may impact the substrate 12 are too small to damage the substrate.

Figure 2:
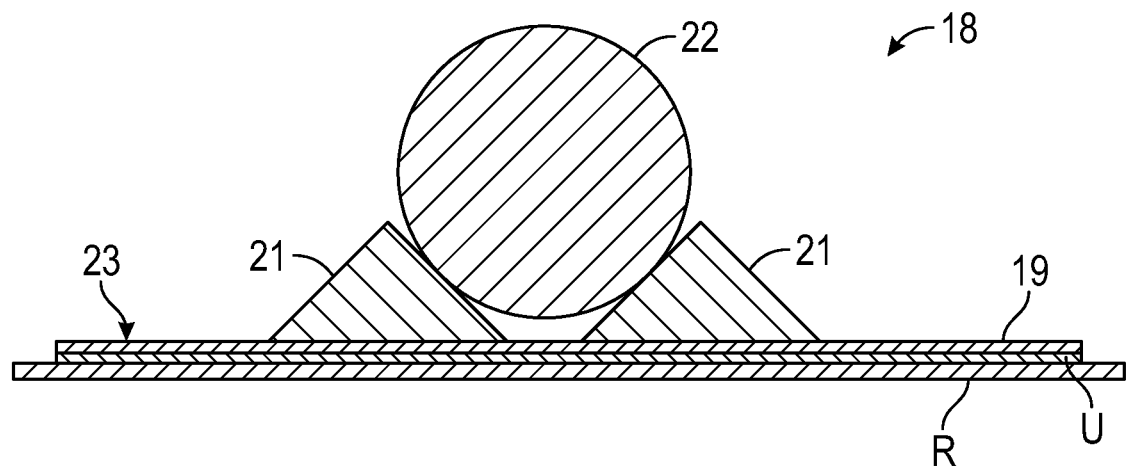
FIG. 2 is a side elevational view of a section of a roofing system that embodies principles of the present disclosure in another form.

FIG. 2 shows another example embodiment of this disclosure. In this embodiment, the substrate is generally indicated at 19 with an array of polygon cones or pyramid-shaped features/projections 21 project upwardly from a roofing substrate 19 to upper edge portions or points. Each feature of the array polygon cones 21 may have a height above the substrate 19 of ¼ inch to 6 inches, such as ¼ inch to 5 inches, ¼ inch to 4 inches, ¼ inch to 2 inches, ¼ inch to 1 inch, ¼ inch to ½ inch, or ¼ inch to ⅓ inch. The dihedron angle between the roofing substrate surface and each face of the polygon may be 30 degrees to 90 degrees, 40 degrees to 60 degrees, or 45 degrees to 55 degrees. The polygon cones 21 are aligned so their baselines are separated by a distance of ¼ inch to 2 inches.

In some embodiments, the polygon cones are aligned so their baselines are separated by a distance of ¼ inch to 1 inch. In some embodiments, the polygon cones are aligned so their baselines are separated by a distance of ¼ inch to ½ inch; by ¼ inch to ¾ inch; ½ inch to 1 inch or ¾ inch to 1 inch. Additional, greater or lesser spacing distances between the bases or lower ends of the surface features 21 also can be used. For example, in some instances, the surface features 21 can be spaced at ½ inch to ⅛ inch, or ¼ inch to ⅛ inch, or ⅜ inch to ⅛ inch; or at other spacing's selected based upon a projected size of objects impacting the substrate and the energy to be dissipated by such impacts.

The baseline separation is chosen so that by close estimation, when a large hail stone 22 capable of damaging the substrate hits the roof, it always impacts a face (or an edge or tip in rare cases) of one of the polygon cones. For example, the spacing's between the baselines or lower edges of the surface features can be selected to receive hail stones of between ½ inch to 3 inches; ½ inch to 2½ inches, ½ inch to 2 inches, ½ inch to 1½ inches; ½ inch to 1 inch, or other sizes, therebetween. As indicated in FIG. 2, the momentum of the hail stone thus can be separated into two smaller momentum vectors as indicated by vectors 23. One of the resulting vectors will be perpendicular to the roofing substrate and the other will be parallel to the substrate but both are smaller than the original momentum vector. This, in turn, effectively redirects part of the energy of the impact in a direction parallel to the substrate or roof surface. The substrate has much greater mechanical strength in this direction. As a result, the energy of the impact is partially directed parallel the plane of the substrate where the energy is easily absorbed without damage. Further, the direction of the hail stone 22 also is diverted so that the hail stone bounces to the side to engage an adjacent feature and generally does not directly impact the roofing substrate. Other spacing's and angles also can be selected to create or provide a redirection of the objects at an angle and away from a substantially perpendicular impact against the substrate and roof, for reduction or scattering of energy generated by such impacts.

Figure 3:
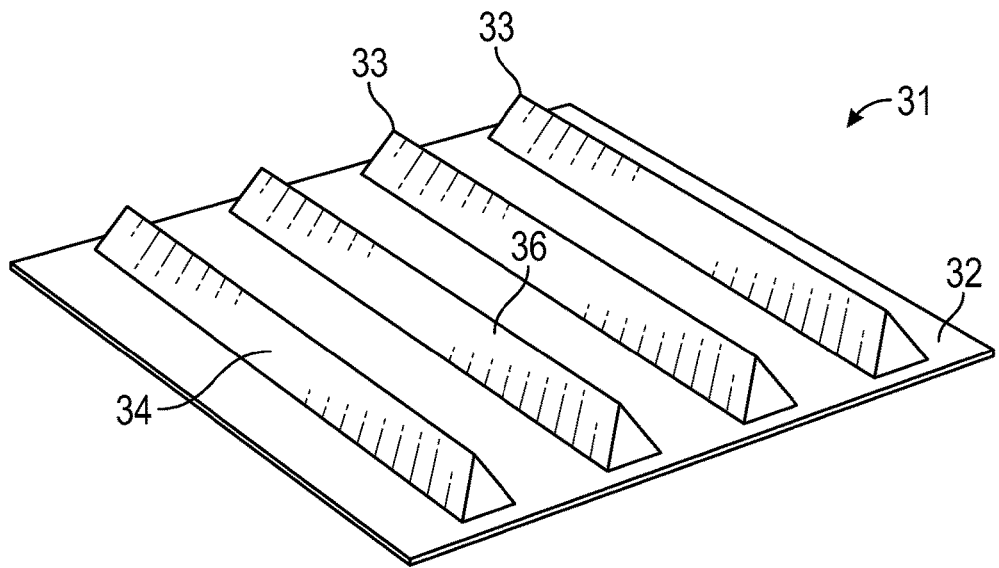
FIG. 3 is an isometric view of a section of a roofing system that embodies principles of the present disclosure in yet another form.

The features can take on a variety of shapes other than the cone shapes of FIGS. 1 and 2. These may include, for example, hemispherical or oblong spheroidal or a series of ridges and troughs. FIG. 3 shows an example system 31 comprising a roofing substrate 32 from which an array of exposed parallel lined features 33 project upwardly. Each of the features 33 has a first angled surface 34 and a second angled surface 36 that connect or meet at a relatively sharp top edge. The effect on a large hail stone here is similar to that of the embodiment of FIG. 2 in that energy is redirected partially parallel to the roofing substrate and the direction of the hail stone is changed so that it does not directly impact the roofing substrate.

Figure 4A:
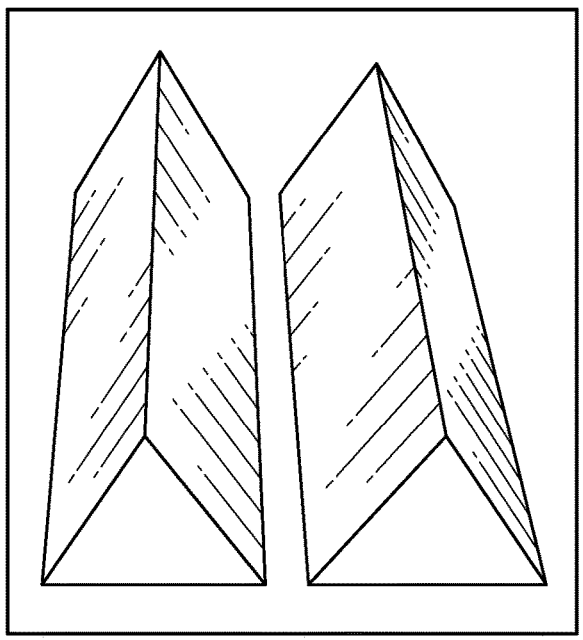
FIGS. 4A-4B illustrate additional arrangements of the roofing system of FIG. 3.
Figure 4B:
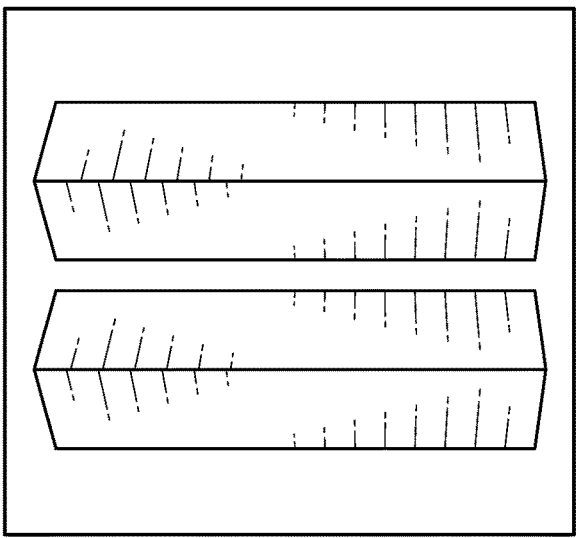

Further example constructions of the features for disrupting and/or diverting the momentum and impact vector and force of hail of other objects striking the substrate are shown in FIGS. 4A-7C. FIGS. 4A-4B show triangular shaped bars similar to the features 33 of FIG. 3, and which can be arranged with closer spacing's (e.g. spaced less than one inch apart, and in some embodiments 1 inch to $1/10^{th}$ inch, and in other embodiments ⅝ inch to ¼ inch). The features further can have a width or base of 1 inch to 2 inches, a length of 1 inch to 3 inches, and a height of 2 inches to 4 inches. In addition, in various embodiments, the width, length and/or height of each feature can vary as noted above, and may be 1/32 inches to 6 inches, such as 1/16 inch to 6 inches, ¼ inch to 6 inches, ½ inch to 6 inches, ¾ inch to 6 inches, 1 inch to 6 inches, 2 inches to 6 inches, 3 inches to 6 inches, 4 inches to 6 inches, 5 inches to 6 inches, 1/32 inch to 5 inches, 1/16 inch to 5 inches, ¼ inch to 5 inches, ½ inch to 5 inches, ¾ inch to 5 inches, 1 inch to 5 inches, 2 inches to 5 inches, 3 inches to 5 inches, 4 inches to 5 inches, 1/32 inch to 4 inches, 1/16 inch to 4 inches, ¼ inch to 4 inches, ½ inch to 4 inches, ¾ inch to 4 inches, 1 inch to 4 inches, 2 inches to 4 inches, 3 inches to 4 inches, 1/32 inch to 3 inches, 1/16 inch to 3 inches, ¼ inch to 3 inches, ½ inch to 3 inches, ¾ inch to 3 inches, 1 inch to 3 inches, 2 inches to 3 inches, 1/32 inch to 2 inches, 1/16 inch to 2 inches, ¼ inch to 2 inches, ½ inch to 2 inches, ¾ inch to 2 inches, 1 inch to 2 inches, 1/32 inch to 1 inch, 1/16 inch to 1 inch, ¼ inch to 1 inch, ½ inch to 1 inch, or ¾ inch to 1 inch.

Figure 5B:
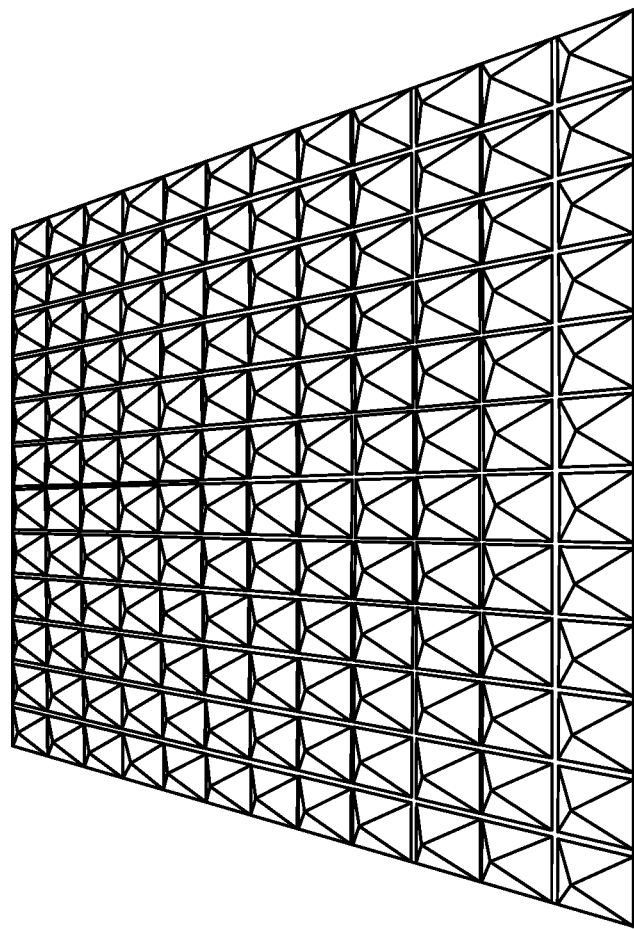
FIGS. 5A-5C illustrate an additional embodiment of a section of a roofing system that embodies principles of the present disclosure in yet another form.
Figure 5A:
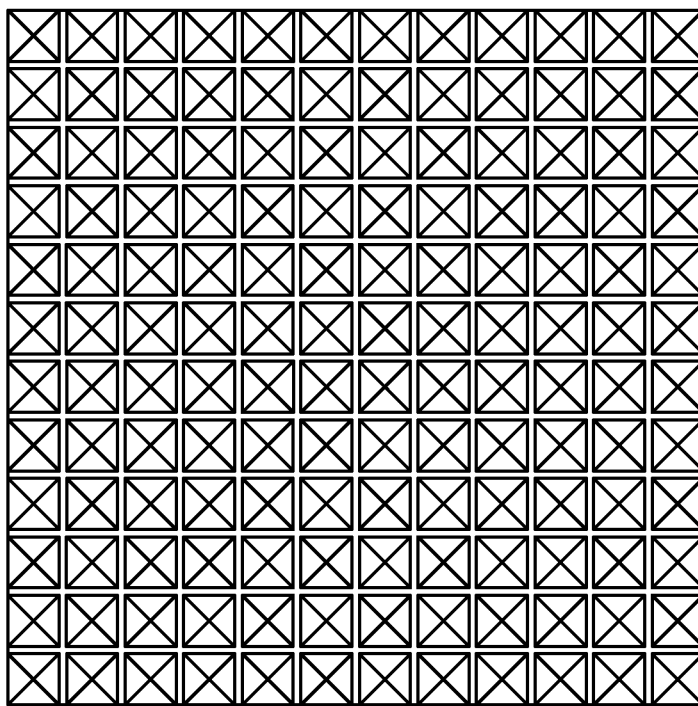
Figure 5C:
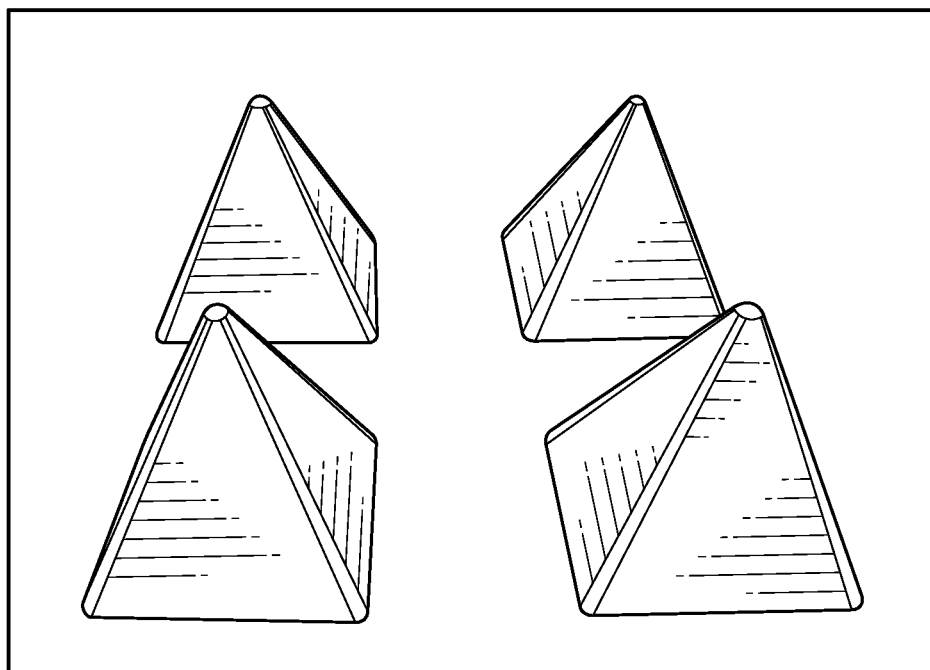

FIGS. 5A-5C illustrate a series of features formed as an array of metal or plastic pyramid shaped members. Other materials such as wood or rubber or composites also can be used. In one embodiment, the features can have a width of ¼ inch to 1 inch at a base thereof, a length of ¼ inch to 1 inch, and can have a height or ⅛ inch to 1 inch. In other embodiments, the width, length and/or height of each feature can further vary as noted above, and may be 1/32 inches to 5 inches, such as 1/16 inch to 5 inches, ¼ inch to 5 inches, ½ inch to 5 inches, ¾ inch to 5 inches, 1 inch to 5 inches, 2 inches to 5 inches, 3 inches to 5 inches, 4 inches to 5 inches, 1/32 inch to 4 inches, 1/16 inch to 4 inches, ¼ inch to 4 inches, ½ inch to 4 inches, ¾ inch to 4 inches, 1 inch to 4 inches, 2 inches to 4 inches, 3 inches to 4 inches, 1/32 inch to 3 inches, 1/16 inch to 3 inches, ¼ inch to 3 inches, ½ inch to 3 inches, ¾ inch to 3 inches, 1 inch to 3 inches, 2 inches to 3 inches, 1/32 inch to 2 inches, 1/16 inch to 2 inches, ¼ inch to 2 inches, ½ inch to 2 inches, ¾ inch to 2 inches, 1 inch to 2 inches, 1/32 inch to 1 inch, 1/16 inch to 1 inch, ¼ inch to 1 inch, ½ inch to 1 inch, or ¾ inch to 1 inch.

Figure 6A:
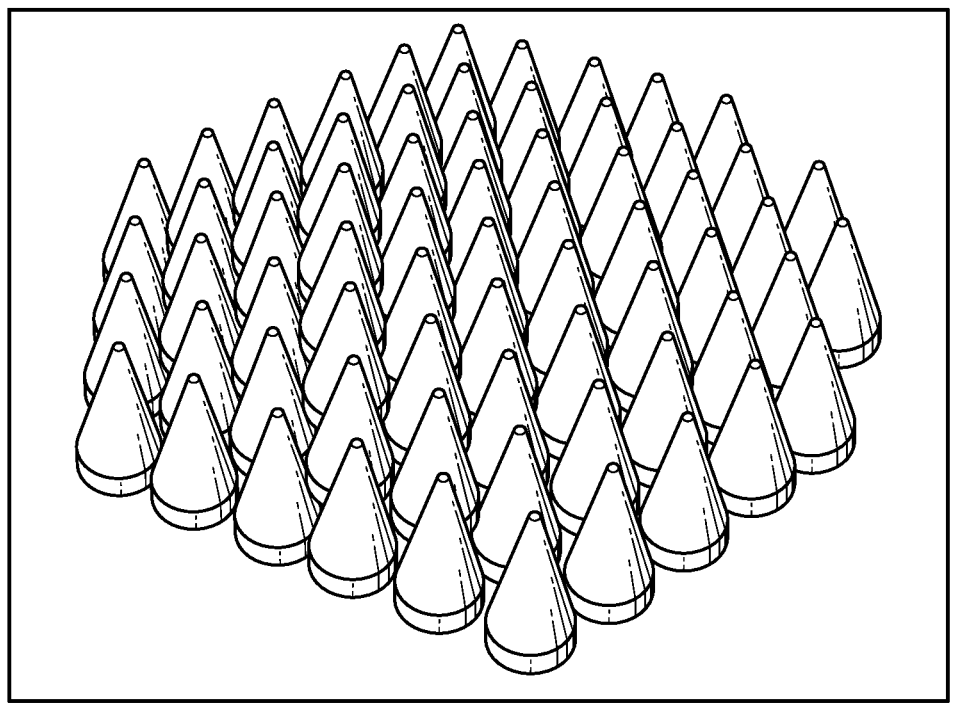
FIGS. 6A-6C illustrate an additional embodiment of a section of a roofing system that embodies principles of the present disclosure in yet another form.
Figure 6B:
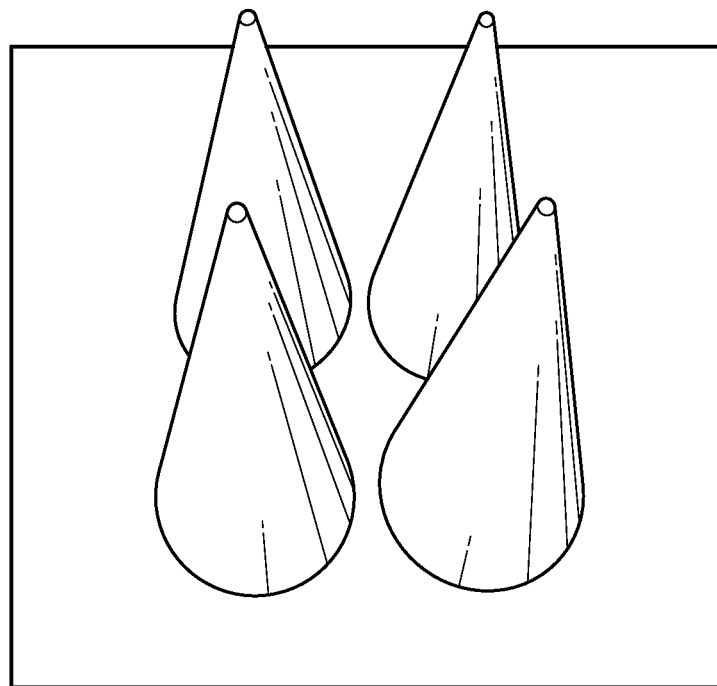
Figure 6C:
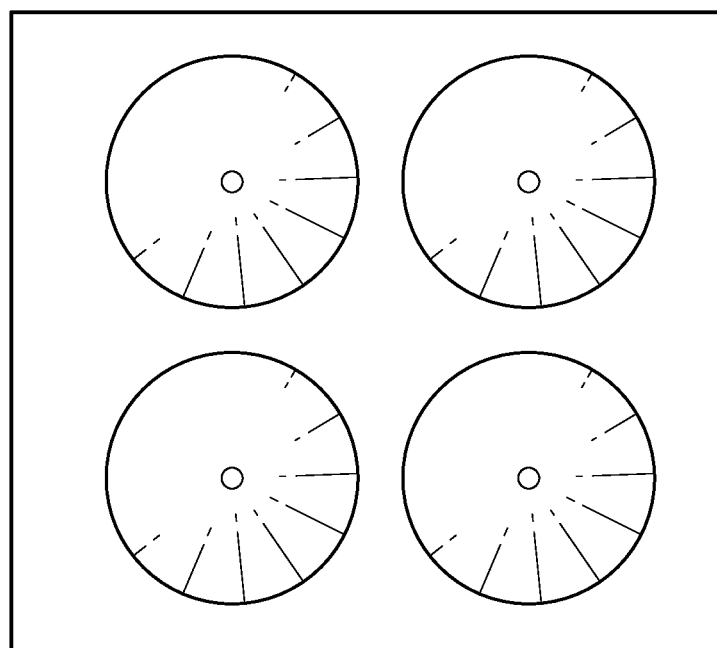

FIGS. 6A-6C show an array of features having a cone shape of ⅛th inch to 1 inch radius by ½ inch to 3 inches high, and formed from various materials, including metal and wood. Other materials, such as plastic, rubber and composites also can be used. In addition, in other embodiments, the base radius and/or height of each feature can further vary as noted above, and may be 1/32 inches to 5 inches, such as 1/16 inch to 5 inches, ¼ inch to 5 inches, ½ inch to 5 inches, ¾ inch to 5 inches, 1 inch to 5 inches, 2 inches to 5 inches, 3 inches to 5 inches, 4 inches to 5 inches, 1/32 inch to 4 inches, 1/16 inch to 4 inches, ¼ inch to 4 inches, ½ inch to 4 inches, ¾ inch to 4 inches, 1 inch to 4 inches, 2 inches to 4 inches, 3 inches to 4 inches, 1/32 inch to 3 inches, 1/16 inch to 3 inches, ¼ inch to 3 inches, ½ inch to 3 inches, ¾ inch to 3 inches, 1 inch to 3 inches, 2 inches to 3 inches, 1/32 inch to 2 inches, 1/16 inch to 2 inches, ¼ inch to 2 inches, ½ inch to 2 inches, ¾ inch to 2 inches, 1 inch to 2 inches, 1/32 inch to 1 inch, 1/16 inch to 1 inch, ¼ inch to 1 inch, ½ inch to 1 inch, or ¾ inch to 1 inch.

Figure 7A:
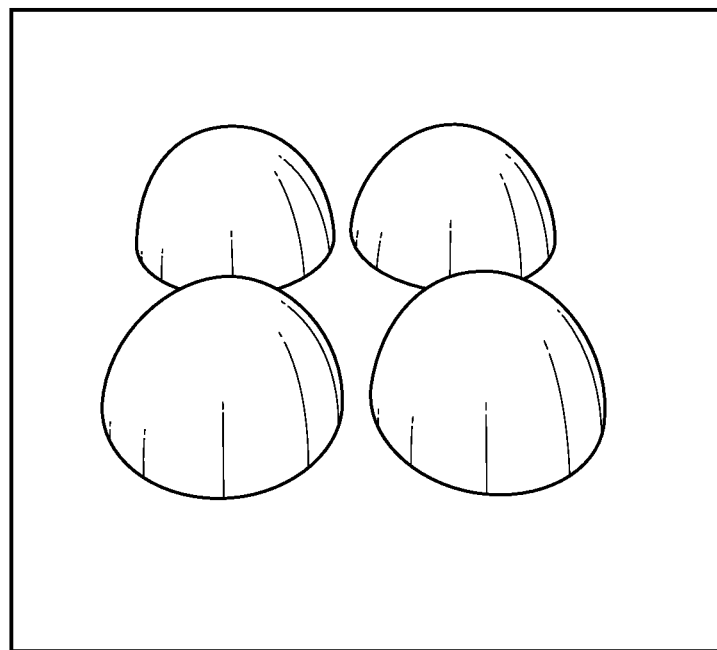
FIGS. 7A-7C illustrate an additional embodiment of a section of a roofing system that embodies principles of the present disclosure in yet another form.
Figure 7B:
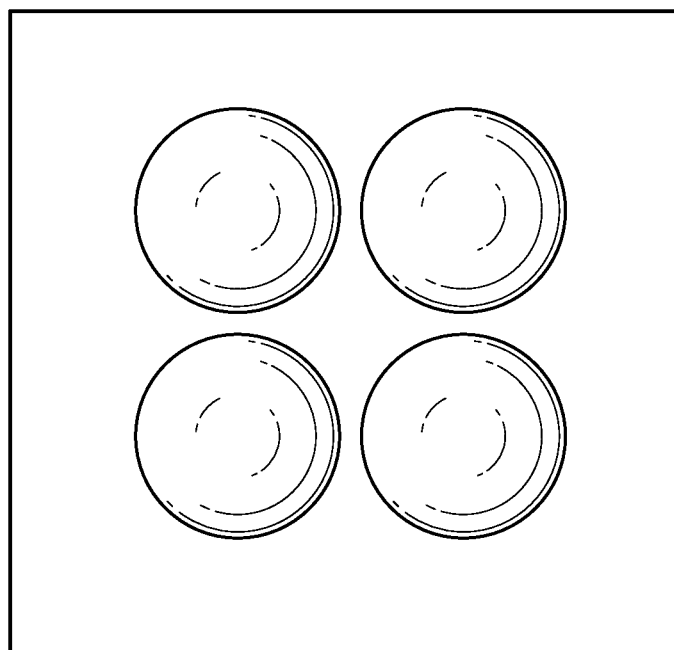
Figure 7C:
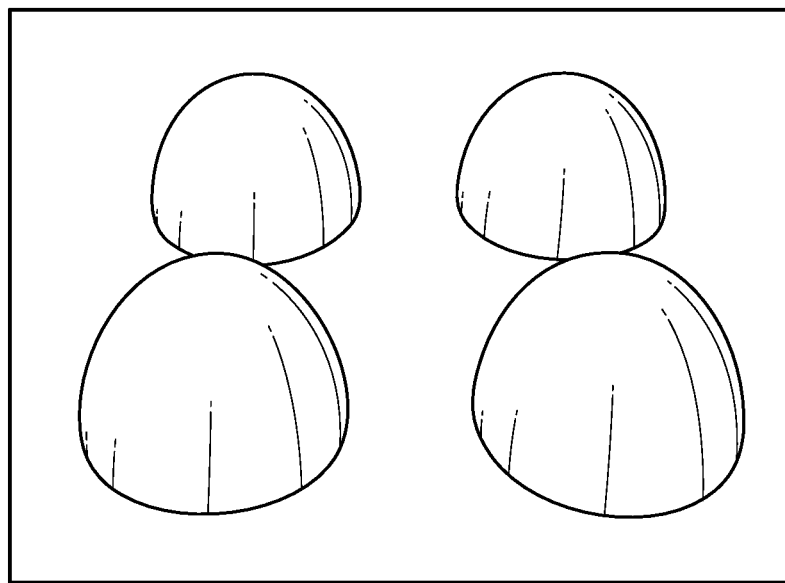

FIGS. 7A-7C show an array of features having a hemispherical shape or rounded configuration. The features can be formed from wood, plastic, rubber, metal, or composite materials. The features further can have a base with a radius of ½ inch to 1 inch, with a height of ½ inch to 2 inches. In addition, in other embodiments, the base radius and/or height of each feature can further vary as noted above, and may be 1/32 inch to 5 inches, such as 1/16 inch to 5 inches, ¼ inch to 5 inches, ½ inch to 5 inches, ¾ inch to 5 inches, 1 inch to 5 inches, 2 inches to 5 inches, 3 inches to 5 inches, 4 inches to 5 inches, 1/32 inch to 4 inches, 1/16 inch to 4 inches, ¼ inch to 4 inches, ½ inch to 4 inches, ¾ inch to 4 inches, 1 inch to 4 inches, 2 inches to 4 inches, 3 inches to 4 inches, 1/32 inch to 3 inches, 1/16 inch to 3 inches, ¼ inch to 3 inches, ½ inch to 3 inches, ¾ inch to 3 inches, 1 inch to 3 inches, 2 inches to 3 inches, 1/32 inch to 2 inches, 1/16 inch to 2 inches, ¼ inch to 2 inches, ½ inch to 2 inches, ¾ inch to 2 inches, 1 inch to 2 inches, 1/32 inch to 1 inch, 1/16 inch to 1 inch, ¼ inch to 1 inch, ½ inch to 1 inch, or ¾ inch to 1 inch.

The surface features described herein may be made of any appropriate material such as, for example, metal, wood, composite materials, cement, masonry, rubber, plastic, ceramic, foam, or any combinations of these materials. The material of the surface features further can be selected based upon desired mechanical properties of such materials, such as its ability to deform and/or withstand the energy or force of an impact of an object; for example, based upon an ability of the selected material to break-up hail stones of up to 3 inches or greater, or deform and absorb or dissipate the energy generated by an impact of larger objects.

In some embodiments, the surface features also may be secured to the roofing substrate, such as in the field or at the factory, by mechanical fasteners such as nails or screws, by adhesives, sealants, and/or by interlocking mechanisms or other connectors, which can enable replacement or positioning of the features in patterned arrangements. The features or structures also may be integrally formed as part of the roofing substrate 12 or be parts of a covering sheet or plate attached to the roofing substrate.

The roofing material or substrate 12 will be installed along the roof deck or roofing structure as part of a roofing system to form a roof of a building or other structure, with an upper surface of the substrate configured to withstand exposure to an outdoor environment, e.g. weather such as rain, snow, UV, etc. The substrate further will have impact resistant features or structures arranged in an array along its upper surface. Thereafter, as the roof is subjected to impacts, such as hail stones, etc., as indicated in FIG. 2, the impact resistant or impact dissipating surface features or structures will block or otherwise divert the hail stones or other objects from directly striking the substrate, and thus will cause the impact force of such objects to be diverted and at least partially absorbed or diminished to provide protection to the underlying roof. Still further, in embodiments, an underlayment material such as Deck-Armor™ underlayment produced by GAF, or other, similar underlayment material, will be applied between the lower surface of the substrate and an upper surface of the deck of the roof, to provide additional watershedding protection.

Example

Impact resistance was tested using one inch by one inch by ⅜-inch plywood substrates. Arrays of features were attached to the plywood surface using Super Glue brand adhesive. The same plywood substrate without any additional features was used as a control. All samples were subjected to impact by two-inch diameter ice balls accelerated with 40 psi pneumatic pressure. The control plywood board was completely shattered with visible cracks on the opposite side. All samples with additional features, including those shown in FIGS. 4A, 5A, 6A, 6B, and 7A, survived the ice ball bombardment without damaging the plywood substrate.

Figure 8:
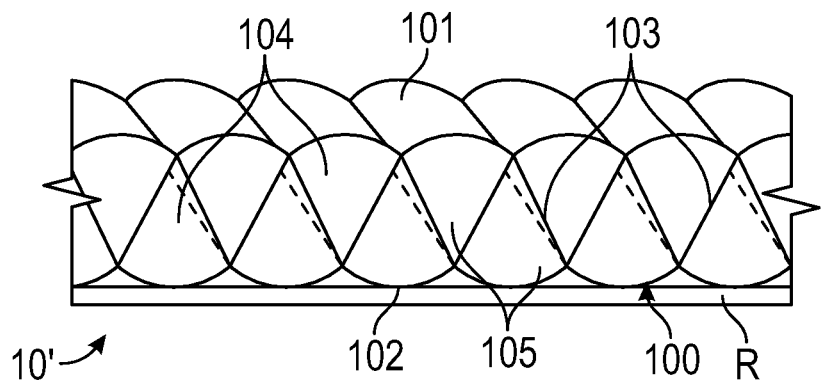
FIG. 8 illustrates still another embodiment of a roofing system, including a roofing material that exemplifies principles of the present disclosure.

In another aspect of an impact resistant roofing system 10' according to the principles of the present disclosure, FIG. 8 illustrates one example embodiment of a roofing material 100 configured to protect a roof on which the roofing system 10' is installed from impacts of hail and other objects. By way of illustration and not limitation, in some constructions, the structural component of the roofing material 100 can be composed of a plurality of substantially continuous sheets or layers of a polymer material that will be positioned over a roof deck, for example, being rolled out or otherwise applied and secured to the roof deck such as by sealants or adhesive materials. In an embodiment, the structural component of the roofing material 100 can include 3 substantially continuous sheets or layers of a polymer material. Other constructions including less than 3 sheets or layers or greater than 3 sheets or layers also can be used.

The first or top sheet 101 generally can be configured to act as a primary watershedding surface, and is exposed to the environment. Accordingly, in some embodiments, the first sheet 101 will comprise a polymer that is naturally UV stable or UV stabilized. For example, and without limitation, the first sheet can include a thermoplastic polyolefin (TPO) membrane, such as an EverGuard® TPO membrane as produced by GAF, or other, similar material. The first sheet 101, further can be configured as a watershedding material or provided with watershedding features.

A second or bottom sheet 102 acts as the back of the roofing material. The second sheet 102 generally does not necessarily require UV stabilization because it will not be exposed to the environment. The second sheet 102 may be treated with an adhesive layer or otherwise include an adhesive or sealant material located on its bottom surface to provide means of attaching the roofing material to an underlying roof structure or deck. By way of example, and without limitation, the second layer can include an underlayment material such as Deck-Armor™ underlayment produced by GAF, or other, similar underlayment material. Additionally, in some embodiments, a separate or additional underlayment material sheet can be positioned below the second sheet 102 of the roofing material and over the deck of the roof. The roofing material should not be penetrated by nails or other fasteners during installation.

The third or intermediate sheet 103 of polymer in this example is alternately attached to the interiors of the first and second sheets to create or form individual interior volumes or pockets 104 within the thickness of the material. In some embodiments, the interior volumes 104 are filled with a filler 105. In embodiments, the filler is a particulate filler, and the intermediate or third sheet 103 will be configured to define one or more pockets or interior volumes to secure the filler material 105 between the first and second sheets, e.g. contained within the interior volumes or pockets 104 defined therebetween.

The material form factor may be a rolled good, e.g. being formed as a multi-layer composite with interior volumes or pockets with the filler material enclosed therein between the first and second sheets, and which can be rolled out and applied over and secured to the roof structure. For example, and without limitation, in embodiments, the roofing material can have an overall thickness of ⅛ inch to 1 inch; in some embodiments, ¼ inch to 1 inch, in other embodiments, ¼ inch to ¾ inch; and in still other embodiments, ¼ inch to ½ inch. Additional thicknesses greater than 1 inch, and less than ⅛ inch also can be provided depending on the application and/or environment in which the roofing material is to be used.

The roofing material also can be formed and installed as individual panels with the top and bottom edges sealed after the interior volumes or pockets are filled with particulate. The intermediate or third sheet of polymer material 103 may be shaped and/or attached to the other sheets in ways other than shown in FIG. 8, so long as one or more pockets of interior volumes are defined between the first and second sheets 101/102, with the pockets or interior volumes configured or otherwise adapted to be suitable for containing a filler material therein. In addition, while the roofing material generally will be installed as a permanent roofing material, it also can be used as a temporary roof covering in some applications.

In some embodiments, the filler 105 comprises a material or mixture of materials that can be ground into a manageable particulate size and that will not agglomerate, melt, or otherwise fuse or decompose into smaller particle sizes under the environmental conditions typical to a roof surface. For example, and without limitation, the filler 105 may be sand, ground tire rubber, ground recycled asphaltic shingles, rice hulls, clay granules, or any other suitable material, or combinations thereof. Alternatively, the filler 105 may be a material other than a particulate material such as, for instance, a gel or foamed material or combinations thereof. Still other granular and/or flowable or resilient materials also can be used to provide a cushioning and energy absorbing or dissipating effect.

When a foreign object such as a hail stone, or other object, impacts the roofing material on its exposed surface, the exposed surface deforms and the energy or force of the impact of the object is transmitted to the pockets and the particulate filler 105 contained in the internal volumes 104 thereof. This, in turn, will cause a movement, displacement, shift and/or redistribution the particulate filler 105 within the underlying pockets or interior volumes 104, which dissipates the force and/or energy of the impact. Redistribution of the particulate filler 105 during a hail storm or over time also can create a substantially continuously changing surface geometry of the roofing material. Each time an object impacts the roofing material, the particulate filler below the impact site is displaced. Over time, this acts to remove residual deformation left by previous impacts. The result is a surface texture that, even though changing, is believed to be acceptable to homeowners. In addition, the materials used for the first, second and/or third layers can have a resiliency that can help absorb the energy of impacts and can rebound or adjust, such that the roofing material can absorb impacts and return to an initial configuration to substantially remove the appearance of such impacts.

On occasion, a single large impact or the cumulative effect of multiple impacts at the same location can be sufficient to penetrate the first sheet 101. This compromises the functional aspects of the roofing system by creating a path for water to seep to underlying structure. In this event, the particulate filler will leak from the impacted and penetrated location. That is, when an opening in the first layer occurs due to the impact of the object, the filler material is configured to leak out from the opening. Such a leak can be clearly and immediately visible from the ground as an indication that the functional integrity of the roofing system has failed. In this regard, the particulate filler may be of a contrasting color to the overlying and/or underlying sheets 101 and 102 to make the location of a penetration even more visible. When a functional failure is detected, the affected portion of the roofing material can be repaired or replaced before a leak infiltrates to the structure of a building below.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present disclosure as set forth in the appended claims.

What is claimed is:
1. A roofing system, comprising:
a deck;

a substrate positioned over the deck, the substrate including:
an upper surface exposed to an outer environment; and
a plurality of surface features positioned across the upper surface;
wherein the substrate comprises a roofing membrane;
wherein the surface features are exposed to the outer environment and are arranged across the upper surface so as to intercept an object striking the substrate;
wherein each of the surface features comprises an impact resistant material and is configured to reduce an energy of an impact of the object striking the substrate;
wherein the surface features comprise hemispherical, pyramid, or triangular shaped structures, or combinations thereof, and have a height of ¼ inches to 6 inches above the upper surface of the substrate; and
an underlayment positioned between the substrate and the deck.

2. The roofing system of claim 1, wherein reduction of the energy of the impact of the object by the surface features comprises redirecting the energy, absorbing the energy, breaking up the object upon impact, or combinations thereof.

3. The roofing system of claim 1, wherein the surface features further comprise a cylindrical base, and a conical section that extends from the cylindrical base and terminates in a tip portion.

4. The roofing system of claim 1, wherein the surface features further comprise a first angled surface and a second angled surface, and wherein adjacent surface features are spaced apart by a distance based upon a range of sizes of the object striking the substrate and a strength of the impact resistant material of the surface features.

5. The roofing system of claim 1, wherein the object is hail.

6. The roofing system of claim 1, wherein the surface features comprise a height of 1 inch to 5 inches above the substrate.

7. The roofing system of claim 1, wherein the surface features each comprise a base and a pointed tip; and wherein the base of adjacent surface features are spaced apart by a distance of ¼ inch to 1 inch.

8. The roofing system of claim 1, wherein the surface features further comprise a base having a width of 1/32 inches to 6 inches, and a height of ¼ inch to 5 inches above the substrate; and wherein the bases of adjacent surface features are spaced apart by a distance of ¼ inch to 1 inch.

9. A roofing system, comprising:
a deck;
a substrate positioned over the deck, the substrate comprising a roofing membrane including:
a first surface exposed to an outer environment and a second surface in contact with the deck; and
a plurality of surface features positioned across the first surface of the roofing membrane, the surface features comprising sloped, conical, angled, rounded, or pointed structures, or combinations thereof;
wherein the surface features are exposed to the outer environment and are arranged across the first surface so as to intercept an object striking the substrate;
wherein each of the surface features comprises an impact resistant material and is configured to reduce an energy of an impact of the object striking the roofing membrane;
wherein the surface features comprise a height of ¼ inches to 6 inches above the first surface of the roofing membrane;
wherein the surface features are spaced apart by a distance based upon a selected range of sizes of the object striking the substrate and a strength of the impact resistant material of the surface features.

10. The roofing system of claim 9, wherein the surface features further comprise at least one angled surface extending from a base to a tip at an angle of 30° to 90°; and wherein the bases of adjacent surface features are spaced apart by a distance of ¼ inch to 1 inch.

11. The roofing system of claim 9, wherein the surface features further comprise hemispherical, pyramid, or triangular shaped structures, or combinations thereof, each having a width or diameter of 1/32 inches to 6 inches at a base thereof, and a height of ¼ inch to 5 inches above the first surface of the roofing membrane; and wherein the bases of adjacent surface features are spaced apart by a distance of ¼ inch to 1 inch.

12. The roofing system of claim 9, wherein the surface features comprise a height of 1 inch to 5 inches above the first surface of the roofing membrane.

13. The roofing system of claim 9, wherein the surface features comprise a base and a tip; and wherein the base of adjacent surface features are spaced apart by a distance of ¼ inch to 1 inch.

14. A roofing system, comprising:
a deck;
a substrate positioned over the deck, the substrate comprising a roofing shingle including:
a first surface exposed to an outer environment and a second surface in contact with the deck; and
a plurality of surface features positioned across the first surface of the roofing shingle;
wherein the surface features are exposed to the outer environment and are arranged across the first surface so as to intercept an object striking the substrate;
wherein each of the surface features comprises an impact resistant material and is configured to reduce an energy of an impact of the object striking the roofing shingle;
wherein the surface features comprise hemispherical, pyramid, or triangular shaped structures, or combinations thereof, and have a height of ¼ inches to 6 inches above the first surface of the roofing shingle.

15. The roofing system of claim 14, wherein the surface features further comprise a width of 1/32 inches to 6 inches at a base thereof, and a height of ¼ inch to 5 inches above the first surface of the roofing shingle; and wherein the bases of adjacent surface features are spaced apart by a distance of ¼ inch to 1 inch.

16. The roofing system of claim 14, wherein the surface features each having a base and a tip; and wherein the base of adjacent surface features are spaced apart by a distance of ¼ inch to 1 inch.

17. The roofing system of claim 14, wherein the surface features comprise a height of 1 inch to 5 inches above the first surface of the roofing shingle; and wherein the surface features are spaced apart by a distance based upon a selected range of sizes of the object striking the roofing shingle and a strength of the impact resistant material of the surface features.

18. The roofing system of claim 14, further comprising an underlayment positioned between the substrate and the deck.

19. The roofing system of claim 9, further comprising an underlayment positioned between the substrate and the deck.

20. The roofing system of claim 9, wherein the substrate comprises a roofing shingle, tile, or roofing membrane.

\* \* \* \* \*